United States Patent [19]

Lüke et al.

[11] 4,202,733
[45] May 13, 1980

[54] PROCESS AND APPARATUS FOR PREHEATING COAL INTENDED FOR USE IN COKING INSTALLATIONS

[75] Inventors: Willy Lüke, Düsseldorf; Günter Gabriel, Bochum, both of Fed. Rep. of Germany

[73] Assignees: Bergwerksverband GmbH; Didier Engineering GmbH, both of Essen, Fed. Rep. of Germany

[21] Appl. No.: 959,186

[22] Filed: Nov. 7, 1978

[30] Foreign Application Priority Data

Nov. 11, 1977 [DE] Fed. Rep. of Germany ....... 2750513

[51] Int. Cl.² .................. C10B 57/10; C10B 31/00; C10B 29/00; C10B 45/00
[52] U.S. Cl. ............................................. 201/1; 34/56; 201/41; 202/262; 202/270; 414/161; 422/111
[58] Field of Search .................. 201/1, 41; 202/262, 202/270; 34/56; 422/111; 214/17 A, 17 CA; 414/161

[56] References Cited

U.S. PATENT DOCUMENTS

| | | | |
|---|---|---|---|
| 2,673,832 | 3/1954 | Lassiat | 422/111 X |
| 2,677,604 | 5/1954 | Nelson | 201/1 X |
| 2,834,658 | 5/1958 | Lieffers et al. | 34/56 X |
| 3,216,595 | 11/1965 | Wethly | 214/17 CA X |
| 3,427,138 | 2/1969 | Donnelly et al. | 422/111 X |
| 3,523,065 | 8/1970 | Schmidt | 202/262 X |
| 3,761,360 | 9/1973 | Auvil et al. | 202/262 X |
| 3,951,750 | 4/1976 | Drebes | 202/262 |

FOREIGN PATENT DOCUMENTS 2534383  2/1976  Fed. Rep. of Germany .......... 201/1

*Primary Examiner*—Barry S. Richman
*Attorney, Agent, or Firm*—Michael J. Striker

[57] ABSTRACT

Coal is preheated prior to passing it into a coking installation by feeding measured amounts of the relatively wet coal into and through one or more circulation dryers heated to an elevated temperature and collecting the hot coal in a collecting bin and automatically measuring the level of the hot coal in said bin and automatically adjusting the amount of coal fed into said dryer depending on the level of coal measured in said collecting bin. Means are provided for preventing further adjustment of the coal feed rate should the exhaust gas temperature of a dryer fall outside the limits of a preselected preset temperature range and to bring the process back under level-actuated feed rate control once the exhaust gas temperature moves back within the preset range.

6 Claims, 1 Drawing Figure

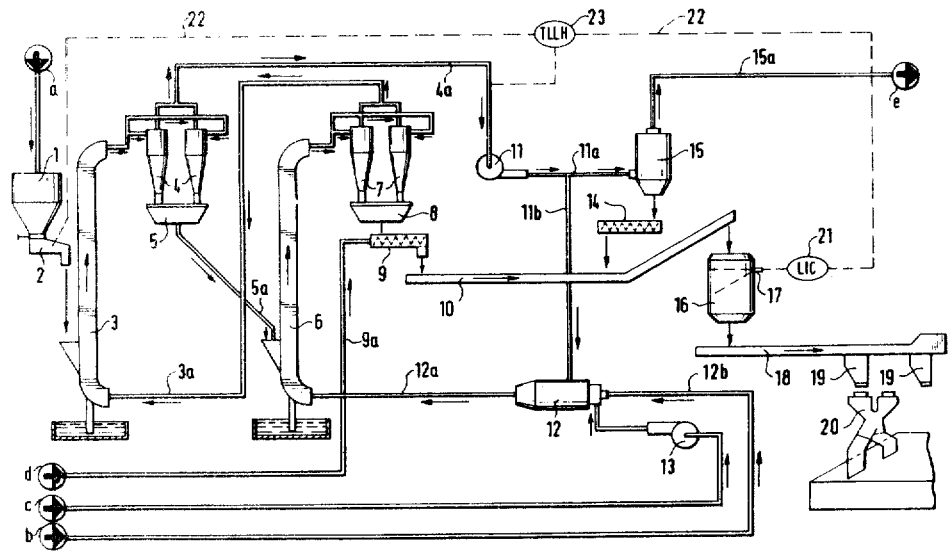

PROCESS AND APPARATUS FOR PREHEATING COAL INTENDED FOR USE IN COKING INSTALLATIONS

BACKGROUND OF THE INVENTION

The present invention relates to a process and apparatus for preheating coal in which relatively wet coal is passed through one or several flow-through circulation heaters and then collected in a hot coal collection bin prior to being charged into the coke even chambers.

In the prior art installations for preheating coal in circulation heaters a crew is continously necessary to operate the process in spite of the fact that previously individual regulating systems have already been automatized. Thus, for instance the heat carrier gas temperature at the discharge opening of the flow-through circulation tubes has been used to regulate the heat supply. Separate regulation circuits in this case adjust the amount of combustion gas and the amount of combustion air which are coupled to each other by an adjustment of their relative ratio. Through a third regulation circuit the recycling of the vapors to the combustion chamber is adjusted. Changes in the water contents of the charged coal and changes in the throughput will thus receive necessary consideration.

The present invention is concerned with a further improvement of the operation of such preheat installations and its objective is to make a screw necessary only in conveying the coal to the installation and removing it therefrom, that is for a comparatively short period of time. During the remaining time the operating personnel may be used for other purposes, for instance for charging the coke oven battery.

SUMMARY OF THE INVENTION

These objectives are met by a process comprising feeding measured amounts of the relatively wet coal into and through one or several flow-through circulation dryers heated by a heat carrier gas to an elevated temperature at which the coal is subjected to a relatively gentle heating whereupon the relatively dry hot coal is collected in a collection bin before passing the coal to the coking batteries.

According to the invention there is provided an automatic measuring of the level of hot coal accumulated in the collection bin and furthermore an automatic adjustment of the amounts of coal fed per unit of time into said dryer or dryers which amount adjustment depends on the level of coal thus measured in the collecting bin.

This kind of adjustment accomplishes that the charging of the wet coal to the preheating installation is automatically adjusted to the requirements of the coke oven battery.

An apparatus for carrying out the invention provides for a coal bin level indicator in the hot coal supply bin and a connected adjustment device which will regulate the charging device for the coal which preferably is in the way of an oscillating channel. Thus, the oscillations of the channel are regulated to adjust the amount of coal passed into the flow-through circulation dryers.

Preferably, the preheating installation is fully operable only within preselected temperature limits of the exhaust gas from one of the dryers. By this manner of operation a falling below or jumping above desired charging limits can be avoided.

According to an embodiment of the invention the amount of the coal supply is adjusted when limits above 40 or below 110% of the desired charge volume of coal are reached. This adjustment is accomplished according to the invention by limiting it to a certain range of the temperature of the flue gas expelled from the circulation dryer or dryers. The invention thus is based on the realization that the gas temperature at the discharge opening of the dryer stage or in case of a one-stage heating installation at the end of the one heater-dryer directly affects the amount of charge of wet coal passed into the drying and preheating installation.

BRIEF DESCRIPTION OF THE DRAWING

The single FIGURE of the drawing, in a diagrammatic form, shows an apparatus for carrying out the process of the invention.

EXAMPLE AND PREFERRED EMBODIMENT

The following two-stage preheating installation will further illustrate the invention.

The wet coal a is charged through a conveyor system from the coal mixing installation to the supply bunker 1. From the bunker 1 the coal is withdrawn through a dosage device which is shown as an oscillating trough 2 which cooperates with a catapult feeder by which the coal is fed into the first flow-through tube, the dryer stage 3. The coal is then dried in this stage to about 5% moisture contents by heat carrier gases which are introduced through the duct 3a and which have already been cooled off from their initial temperature to about 270° C. in the second flow-through dryer tube, the drying stage 6. At the same time the coal is heated to a temperature of about 80° C.

At the top end of the dryer stage 3 the predried coal is separated by cyclones 4 arranged in parallel from the heat carrier gas and is passed by gravity via a buffer bin 5 and duct 5a to the bottom end of the second flow-through tube, the preheating stage indicated in the drawing as 6.

The heat carrier gases are obtained from a combustion chamber 12 and have an initial temperature of about 550° C. Through the duct 5a the predried coal is further heated by these heat carrier gases. At the upper end of the heating stage 6 a temperature of about 200° C. is thus reached by the coal.

It will be understood that the numerical values given here are applicable mainly to a coal of about 10% initial moisture contents which is intended to be heated to about 200° C. to lower its moisture and accomplish the necessary drying of the coal. The stated values, particularly for the temperatures, will vary according to the initial moisture contents of the coal and the desired final heating temperature.

After separating the heating gas and the heated coal in another set of parallel cyclones 7, the coal is passed through another buffer bunker or tank 8 into a mixer 9. In the mixer it is mixed with necessary additives indicated as d and introduced through the duct 9a. This will accomplish a substantial reduction of the dust transfer during charging of the ovens and a desirable adjustment of the bulk density of the coal to be coked.

The heated coal is then passed through a chain conveyor 10 into a hot coal collection bunker 16 from where it may be further transferred to the coke oven chambers through a measuring container (not shown) which corresponds to the capacity of the oven chamber, and then furthermore via a chain conveyor 18, conveyor outlets 19 and a Y-chute 20 and finally to the coke oven chambers.

The heat carrier gas is produced in the combustion chamber 12 by burning a combustion gas (coke oven gas) b which is passed to the burner through the duct 12a. At the same time a blower 13 feeds combustion air c to the burner.

As already indicated the heat carrier gas which is discharged from the cyclone 7 is passed through the duct 3a to the bottom end of the first dryer stage 3. The flue gas leaving the cyclones 4 via the duct 4a is withdrawn by means of a blower 1a and passed through duct 11 to a dust separator 15. The coal dust which is separated in this device is passed through a through conveyor 14 onto the chain conveyor 10. The flue gas e is discharged from the dust separator 15 through a duct 15a.

Between the blower 11 and the dust separator 15 a recycling duct 11b is provided for passing the hot vapors to the combustion chamber 12. The recycled vapors there are mixed with the heat carrier gas and reduce the temperature thereof to about 550° C.

In passing the hot heat carrier gas at first into the second circulation dryer, that is the heater stage 6 for heating the already predried coal, a counter-current principle is made use of, that is comparatively low temperatures are possible in both stages. In the heater stage 6 the heat carrier gas undergoes a temperature loss of about 270° C. In consequence of this phenomenon the wet coal is very gently predried in the first dryer stage 3.

In order to obtain an automatic adjustment of this preheating installation for coking plants so as to be able to handle the variations of the coking coal supply for the coke oven battery, the hot coal supply bunker 16 according to the invention is provided with a gauge 17 for measuring the level of the coal in the bunker. By means of the level indicator control (LIC) 21 an electrical signal is passed to the oscillating trough 2 via the signal circuit 22. At a lower level of the hot coal in the supply bin 16 a higher or stronger adjustment signal is caused to form which is passed to the oscillating trough 2 and causes actuation of its oscillations. Accordingly, with a lower level in the hot coal supply a larger amount of coal is charged per unit of time into the dryer stage 3.

It is preferred and advisable to operate the preheating installations within predetermined limits of about 40 to 110% of the desired normal charge. For this purpose the invention provides for an additional automatic adjustment which prevents further charge adjustments at the predetermined minimum or maximum temperatures of the exhaust gas. It has been established that there is a direct connection between the gas temperature at the discharge opening of the dryer stage 3 and the amount of coal charging the installation. Thus, a possibility of limitation of the adjusting circuit for actuating the oscillating trough 2 is possible by means of the gas temperature at the exit of the dryer stage 3.

This limitation is accomplished by a circuit 22 which includes a lock member 23 (TLLH = temperature limits for low and high temperature) which is connected to a temperature sensor with the exhaust gas in duct 4a or if desired the exhaust gas in duct 3a. The signal produced by the level regulator LIC is transmitted unobstructed through the lock member 23 (TLLH) as long as the temperature of the exhaust gas is within the predetermined limits, for instance at a predetermined flow rate is between a temperature of 110° C. and 180° C. in the duct 4a corresponding to between 110% and 40% of the normal volume charge of coal. At a temperature of 110° C. and also at a temperature of 180° C. the lock member 23 (TLLH) is actuated and will prevent further adjustment by level regulator LIC and thus will keep the previous adjustment constant. The charge by the oscillating trough can then no longer be increased or decreased.

Since the withdrawal of preheated coal from the collection bunker 16 is effected in a discontinuous manner this kind of limitation will avoid that the extreme temperature of 180° C. is exceeded or that the temperature falls below 110° C. In consequence of this arrangement the preheating installation will not be subject to a charge with coal below or above the desired amount.

If, on the other hand, the temperature of the exhaust gas is again within the desired range the lock member is released and the signals of the level indicator 21 are again fully effective in actuating the oscillating trough.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process of preheating coal prior to passing it into a coking installation, the said process comprising
    feeding measured amounts of a relatively wet coal into and through at least one flow-through dryer heated by a heat carrier gas to an elevated temperature;
    collecting the relatively dry hot coal in a collecting bin before passing the coal into the coking installation;
    automatically measuring the level of the hot coal accumulated in said bin;
    automatically adjusting the amount of coal fed per unit of time into said at least one dryer as a function of the level of coal measured in said collecting bin;
    measuring the temperature of the exhaust gas expelled from said at least one dryer; and
    automatically shutting off further adjustments of said amount of coal as the temperatures of the exhaust gas indicated by said measurement are below a predetermined minimum or above a predetermined maximum.

2. The process of claim 1 wherein the said shut-off is actuated in response to said temperature measurement upon reaching of the said maximum or minimum temperature limit of the exhaust gas and wherein the shut off is released when the temperature of the gas is again within said temperature limits, whereby the amount of coal fed into said at least one dryer is kept constant as long as the temperature of the exhaust gas is below or above said temperature limits.

3. The process of claim 1 wherein at an initial moisture contents of 10% and a predetermined rate of flow of the coal the said limits of the temperature of the exhaust gas are set at about 110° and 180° C. whereby coal is passed into said at least one dryer at a feed volume between 40 and 110% of the desired normal volume of coal.

4. An apparatus for preheating coal prior to passing it into a coking installation, the said apparatus comprising at least one flow-through dryer;
- feeding means for charging relatively wet coal into said at least one dryer;
- means for passing a heating gas through said dryer together with said coal;
- a collecting bin for receiving the relatively dry hot coal from said dryer;
- means for measuring the level of the hot coal accumulated in said collecting bin;
- means for automatically adjusting the amount of coal fed per unit of time into said dryer as a function of the level of coal measured in said collecting bin;
- a temperature sensor for measuring the temperature of the gas expelled from said dryer or one of said dryers; and
- automatic lock and release means for keeping the said adjustment of the charge constant in response to said temperature sensor when the temperature of the exhaust gas is above or below said temperature limits and for reinstating the adjustment means when said temperature is again within the range of said temperature limits.

5. The apparatus of claim 4 wherein the said feeding means includes an oscillating coal feeding channel and the said adjustment means are adapted to regulate the oscillations of said feeding channel.

6. The apparatus of claim 4 wherein the said feeding means include ducts for passing the coal successively through at least two of said dryers and wherein further ducts are provided to pass the heating gas received from a combustion chamber first through the second of said heating ducts to come in contact with an already preheated coal and thereafter when the temperature of the heating gas has been lowered to pass the gas to the first of said circulation heaters, thus establishing a countercurrent flow between the heating gas and the coal so as to cause the initial preheating of the coal to take place at a rather gentle rate.

* * * * *